(12) United States Patent
Wang

(10) Patent No.: US 7,511,462 B2
(45) Date of Patent: Mar. 31, 2009

(54) DC POWER CONVERSION CIRCUIT HAVING SELF-AUXILIARY POWER AND SELF-PROTECTION

(75) Inventor: Shih-Yuan Wang, Tai-Nan (TW)

(73) Assignee: ADDtek Corp., Songshan District, Taipei (TW)

( * ) Notice: Subject to any disclaimer, the term of this patent is extended or adjusted under 35 U.S.C. 154(b) by 135 days.

(21) Appl. No.: 11/775,850

(22) Filed: Jul. 10, 2007

(65) Prior Publication Data

US 2008/0031022 A1 Feb. 7, 2008

Related U.S. Application Data

(60) Provisional application No. 60/821,578, filed on Aug. 7, 2006.

(30) Foreign Application Priority Data

Dec. 21, 2006 (TW) ............................... 95148261 A

(51) Int. Cl.
*G05F 1/40* (2006.01)
(52) U.S. Cl. ...................................... 323/265
(58) Field of Classification Search ................ 323/265, 323/273, 276, 282, 283, 284, 285, 351
See application file for complete search history.

(56) References Cited

U.S. PATENT DOCUMENTS

| | | | | |
|---|---|---|---|---|
| 6,020,729 A | * | 2/2000 | Stratakos et al. ............ | 323/283 |
| 6,232,752 B1 | * | 5/2001 | Bissell ......................... | 323/225 |
| 7,180,758 B2 | * | 2/2007 | Lincoln et al. ........... | 363/56.01 |
| 7,443,145 B2 | * | 10/2008 | Hackner et al. .............. | 323/224 |
| 2004/0090217 A1 | * | 5/2004 | Muratov et al. ............. | 323/282 |
| 2006/0113971 A1 | * | 6/2006 | Watanabe et al. ........... | 323/265 |
| 2006/0192541 A1 | * | 8/2006 | Hackner et al. ............. | 323/288 |
| 2008/0031025 A1 | * | 2/2008 | Wang .......................... | 363/78 |

* cited by examiner

*Primary Examiner*—Adolf Berhane
(74) *Attorney, Agent, or Firm*—Winston Hsu

(57) ABSTRACT

A DC power conversion circuit having self-auxiliary power and self-protection against a short or open load circuit includes a DC voltage source, a driving circuit, and an auxiliary circuit. The DC voltage source is used for providing a DC power. The driving circuit includes a switch, a first resistor, a control signal generator, a second resistor, a diode and an inductor. The switch is used for conducting or cutting off an electrical connection according to an incoming control signal. The control signal generator senses voltage of the first resistor to generate the control signal. The inductor is coupled between the first resistor and a load circuit. The auxiliary circuit is parallel to the inductor and includes an auxiliary capacitor and an auxiliary diode. The auxiliary capacitor is coupled between the first resistor and the second resistor. The auxiliary diode is coupled between the inductor and the auxiliary capacitor.

12 Claims, 2 Drawing Sheets

DC POWER CONVERSION CIRCUIT HAVING SELF-AUXILIARY POWER AND SELF-PROTECTION

CROSS REFERENCE TO RELATED APPLICATIONS

This application claims the benefit of U.S. Provisional Application No. 60/821,578, filed on Aug. 7, 2006 and entitled "DRIVING CIRCUIT AND METHOD OF CONSTANT CURRENT CONTROL FOR LIGHT EMITTING DEVICE", the contents of which are incorporated herein by reference.

BACKGROUND OF THE INVENTION

1. Field of the Invention

The present invention relates to a direct-current (DC) power conversion circuit, and more particularly, to a DC power conversion circuit having self-auxiliary power and self-protection against a short or open load circuit.

2. Description of the Prior Art

In recent years, a light emitting diode (LED) has been widely applied to various IT and consumer electronic products, used in an indication light or display devices. Unlike a traditional incandescent light bulb, the LED is a luminescent device having advantages of low power consumption, long life, extremely short warm-up time and fast reaction. Moreover, the LED is fitly used in small-scale array devices because of its small size, high vibration tolerance and realization of mass production. According to the physical characteristic of the LED, an LED current varies with a forward bias across the LED by a exponential relationship, indicating that luminance of the LED is proportional to the current. That is, the larger the current the LED bears, the stronger light the LED emits. Thus, there is a need of a conversion circuit to control the forward bias in order for the LED to output steady light.

Please refer to FIG. 1, which is a schematic diagram of a DC/DC conversion circuit 10 according to the prior art. The DC/DC conversion circuit 10 includes a DC voltage source 100, a switch transistor 102, a resistor 104, a diode 106, an inductor 108, a control signal generator 110, a load circuit 112 and a linear regulator 114. The linear regulator 114 is commonly an IC or a simple bias circuit and used for regulating voltage provided by the DC voltage source 100 down to a proper voltage level, so as to provide working voltage for the control signal generator 110. The control signal generator 110 senses voltage or current across the two ends of the sensing resistor 104 and thereby generates a control signal Sc to control the switch transistor 102. With turn-on and turn-off of the switch transistor 102, the current outputted to the load circuit 112 can be controlled. Operations of the DC/DC conversion circuit 10 are simply described as follows. When the switch transistor 102 turns on, the diode 106 bears a reverse bias and thereby cuts off a loop L1 such that the DC voltage source 100 starts to charge the inductor 108. As soon as the switch transistor 102 turns off, the inductor 108 generates a reversed-polarity voltage. In other words, when the switch transistor 102 turns off, the diode 106 conducts the loop L1 so that the inductor 108 transfers electricity to the capacitor 110 and the load circuit 112.

In the prior art, the linear regulator 114 regulates voltage provided by the DC voltage source 100 for providing the control signal generator 110 with the working voltage. However, the linear regulator 114 of the DC/DC conversion circuit 10 usually has a poor efficiency of about 5%-10%, where the efficiency is a ratio of output voltage over input voltage of the linear regulator 114. For example, if the DC voltage source 100 provides a DC voltage of 170 Volts(V) in the DC/DC conversion circuit 10, the linear regulator 114 generally regulates the DC voltage down to 17V in a condition of a 10% efficiency. Assuming that a current across the linear regulator 114 is about 20 mA, the linear regulator 114 has power dissipation: $(170-17) \times 20 = 3.06$ Watt(W). As can be understood from the above, the prior art DC/DC conversion circuit 10 utilizes the linear regulator 114 having the poor efficiency, thereby resulting in large power dissipation. Therefore, the linear regulator 114 wastes energy and may be damaged due to overheat.

SUMMARY OF THE INVENTION

It is therefore a primary object of the present invention to provide a direct-current (DC) power conversion circuit having self-auxiliary power and self-protection against a short or open load circuit.

The present invention discloses a DC power conversion circuit having self-auxiliary power and self-protection against a short or open load circuit. The DC power conversion circuit comprises a DC voltage source, a driving circuit, and an auxiliary circuit. The DC voltage source is coupled to a grounding end and used for providing a DC power. The driving circuit comprises a switch, a first resistor, a control signal generator, a second resistor, a diode and an inductor. The switch has a first end coupled to the DC voltage source, a second end for receiving a control signal, and a third end. The switch is used for conducting or cutting off an electrical connection between the first end and the third end according to the control signal received by the second end. The first resistor has a first end coupled to the third end of the switch and a second end. The control signal generator is coupled to the first end of the first resistor and the second end of the first resistor and used for sensing voltage of the first resistor, so as to generate the control signal. The second resistor has a first end coupled to the DC voltage source and the first end of the switch, and a second end coupled to the control signal generator. The diode has a first end coupled to the second end of the first resistor, and a second end coupled to the grounding end. The inductor has a first end coupled to the second end of the first resistor, and a second end coupled to a load circuit. The auxiliary circuit is parallel to the inductor and comprises an auxiliary capacitor and an auxiliary diode. The auxiliary capacitor has a first end coupled to the second end of the first resistor, and a second end coupled to the second end of the second resistor. The auxiliary diode has a first end coupled to the second end of the auxiliary capacitor, and a second end coupled to the second end of the inductor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
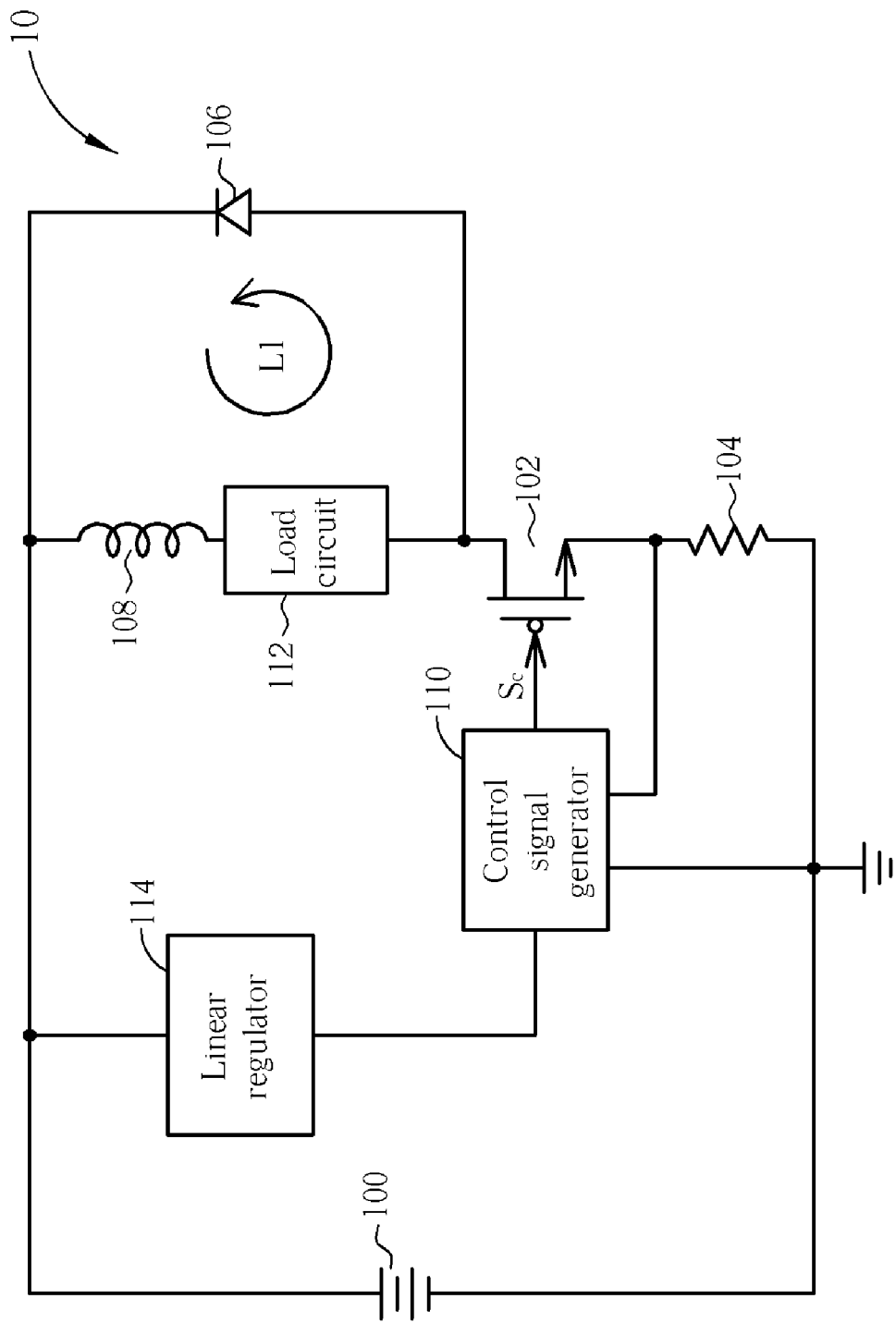
FIG. 1 is a schematic diagram of a DC/DC conversion circuit according to the prior art.
Figure 2:
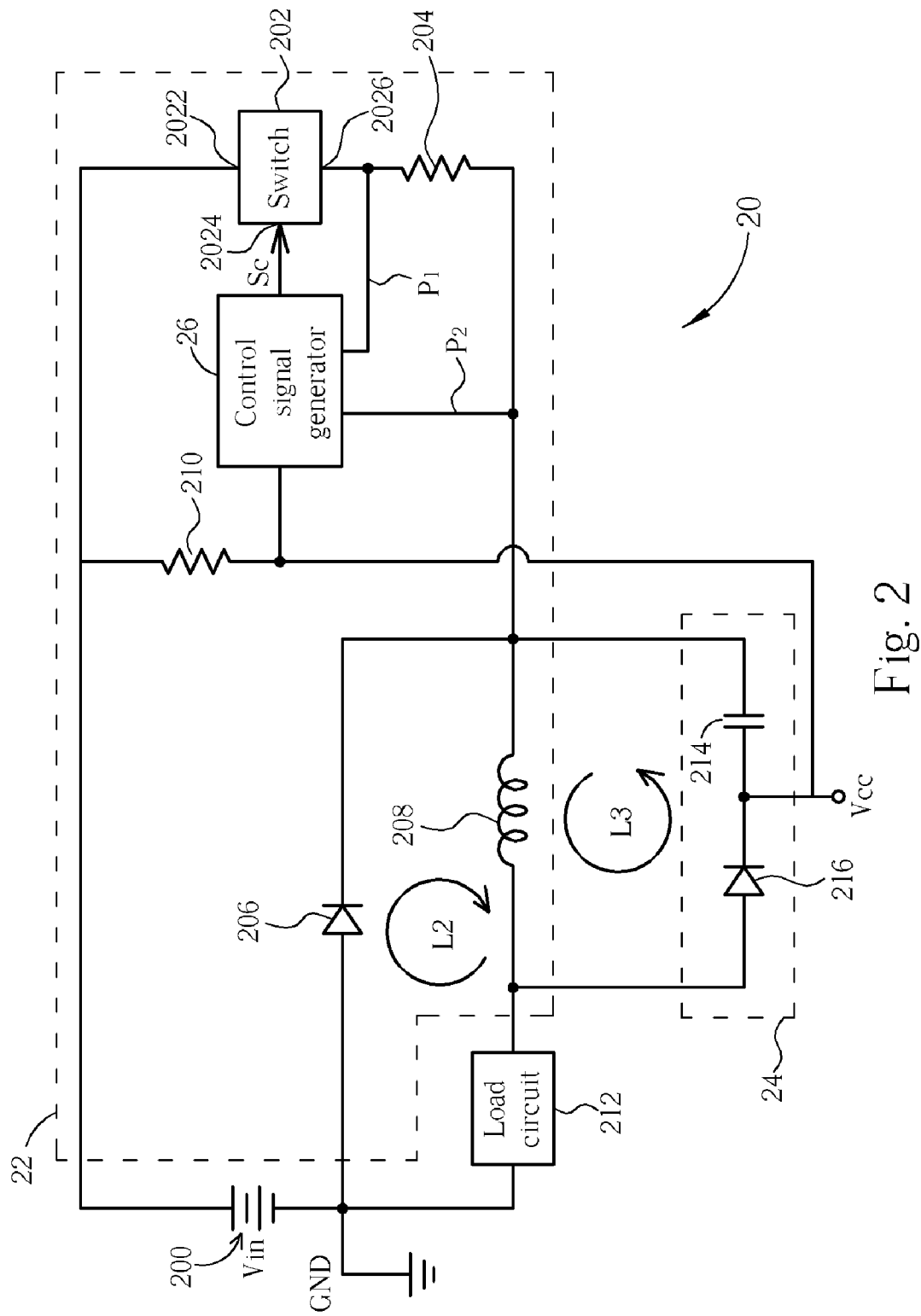
FIG. 2 is a schematic diagram of a DC power conversion circuit according to an embodiment of the present invention.

Please refer to FIG. 2, which is a schematic diagram of a direct-current (DC) power conversion circuit 20 having self-auxiliary power and self-protection against a short or open load circuit according to an embodiment of the present invention. The DC power conversion circuit 20 includes a DC voltage source 200, a driving circuit 22, and an auxiliary circuit 24 and is coupled to a load circuit 212. The DC voltage source 200 is coupled to a grounding end GND and used for providing a DC power Vin. The load circuit 212 includes a lighting device including at least a light emitting diode (LED) and is also coupled to the grounding end GND. The driving circuit 22 is similar to the DC/DC conversion circuit 10 shown in FIG. 1 and includes a switch 202, a first resistor 204, a diode 206, an inductor 208, a second resistor 210 and a control signal generator 26. The switch 202 is used for conducting or cutting off an electrical connection between a first end 2022 and a third end 2026 according to a control signal Sc received by a second end 2024. The switch 202 is commonly a metal-oxide-semiconductor field-effect transistor (MOSFET) and the first end 2022 thereof is a drain, the second end 2024 is a gate, and the third end 2026 is a source. Or, the switch 202 could be a bipolar junction transistor (BJT), and the first end 2022 thereof is a collector, the second end 2024 is a base, the third end 2026 is an emitter. The second resistor 210 has high resistance and is used for providing sufficient voltage to power-on the control signal generator 26. The diode 206 is commonly a p-n junction semiconductor device. Thereby in FIG. 2, the right end is n-type whereas the left end is p-type. The inductor 208 is coupled to the load circuit 212 and is used for storing or releasing electricity provided by the DC voltage source 200. Preferably, the control signal generator 26 is a pulse width modulator and coupled to both ends of the first resistor 204. Thus, The control signal generator 26 can sense voltage of the first resistor 204 and thereby generates the control signal Sc. The control signal Sc is adjusted based on voltage variation of first resistor 204 to control the switch 202.

In the DC power conversion circuit 20, the inductor 208 of the driving circuit 22 is coupled to the auxiliary circuit 24 in parallel. The auxiliary circuit 24 includes an auxiliary capacitor 214 and an auxiliary diode 216. When the DC power conversion circuit 20 powers on, the auxiliary capacitor 214 stores electricity provided by the DC voltage source 200 though the second resistor 210. The auxiliary capacitor 214 becomes an auxiliary voltage source when being fully charged and can provide a steady auxiliary voltage Vcc for the control signal generator 26. The auxiliary diode 216 is coupled between the auxiliary capacitor 214 and the inductor 208, and utilized to prevent a current flow from the DC voltage source 200 into the auxiliary circuit 24 during conducting periods of the switch 202. The current flow may cause unexpected voltage variation in the load circuit 212. The physical characteristic of the auxiliary diode 216 is substantially the same as that of the diode 206, having the same forward bias. In FIG. 2, the right end of the auxiliary diode 216 is n-type whereas the left end is p-type. The DC power conversion circuit 20 further includes a filtering capacitor (not shown in FIG. 2) that is coupled between the grounding end GND and the inductor 208 and used for filtering noise component of the current outputted to the load circuit 212.

Operations of the DC power conversion circuit 20 are described as follows. First, when the DC power conversion circuit 20 powers on, the second resistor 210 regulates the DC power Vin down to a specific voltage level for switching on the control signal generator 26, and simultaneously charging the auxiliary capacitor 214. After switch-on, the control signal generator 26 periodically senses voltage of the first resistor 204 with wires P1 and P2, and thereby timely adjusts the control signal Sc based on the voltage variation. Then, when the switch 202 switches on, the diode 206 and the auxiliary diode 216 bear a reverse bias, thereby cutting off a loop L2 and a loop L3, respectively. Thus, the DC voltage source 200 charges the inductor 208, and meanwhile a current of the first resistor 204 gradually increases with an increasing current of the inductor 208. When the current of the first resistor 204 increases to a predetermined maximum intensity, the control signal generator 26 switches off the switch 202 via the control signal Sc. Once the switch 202 switches off, the diode 206 and the auxiliary diode 216 both operate under the forward bias, thereby conducting the loops L2 and L3, respectively. Since voltage provision of the DC voltage source 200 for the inductor 208 is cut off, the inductor 208 generates reversed-polarity voltage and thereby simultaneously provides electric energy for the load circuit 212 and the auxiliary capacitor 214. Thus, there will be no dramatic variation in the current flow across the load circuit 212, maintaining voltage of the auxiliary capacitor 214 resulting in steady and normal operations of the control signal generator 26. Therefore, regardless of switch-on or switch-off of the switch 202, the auxiliary capacitor 214 acts as a steady voltage source for the control signal generator 26, providing with the auxiliary voltage Vcc. On the other hand, as the current of the first resistor 204 down decreases to a predetermined minimum intensity, the control signal generator 26 again switches on the switch 202 via the control signal Sc. The operations of the DC power conversion circuit 20 revolve by the alternate switch-on and switch-off of the switch 202.

In the DC power conversion circuit 20, assume that voltages of the load circuit 212, the inductor 208 and the auxiliary capacitor 214 are $V_{LD}$, $V_L$ and $V_C$, respectively. Further, according to the loop L2 and L3, a relationship can be represented as:

$$V_L = \text{the forward bias of the diode 216} + V_{LD}$$

$$= \text{the forward bias of the diode 206} + V_C$$

Since the forward bias of the diode 216 is almost the same as that of the diode 206, the relationship between the voltages of the load circuit 212, the inductor 208 and the auxiliary capacitor 214 becomes: $V_L = V_{LD} = V_C$. As a result, if there is short circuit occurring in the load circuit 212, the relationship is $V_L = V_{LD} = 0$ (Volt) due to rapid discharge of the auxiliary capacitor 214. Meanwhile, the DC voltage source 200 is in charge of providing the auxiliary voltage Vcc for the control signal generator 26 through the resistor 210 having high-resistance. The auxiliary voltage Vcc operates at a low voltage level because of the high resistance of the resistor 210 such that the control signal generator 26 enters a hiccup (protection) mode due to insufficient working voltage. In the hiccup mode, the control signal generator 26 operates normally sometimes and idly sometimes. On the other hand, if there is an open circuit in the load circuit 212, the relationship becomes: $V_{LD} = V_C$. In this situation, via the voltage $V_C$ of the auxiliary capacitor 214, the DC power conversion circuit 20 can determine whether the voltage $V_{LD}$ of the load circuit 212 is too high. The control signal generator 26 then automatically adjusts switch-on periods of the switch 202 according to a determined result, so as to prevent the load circuit from being damaged due to too high voltage. In this way, no matter whether the load circuit 212 is short-circuiting or open-circuiting, the DC power conversion circuit 20 controls the working state of the control signal generator 26 based on the auxiliary voltage Vcc outputted by the auxiliary capacitor 214 to timely adjust a switch-on frequency of the switch 202. Therefore, the DC power conversion circuit 20 achieves self-protection.

In summary, in the prior art, the DC power conversion circuit utilizes the linear regulator having a poor efficiency to provide the working voltage for the control signal generator. Thus, the prior art DC power conversion circuit wastes energy. Oppositely, according to the embodiment of the present invention, the DC power conversion circuit parallels the auxiliary circuit with the inductor so that the auxiliary circuit is allowed to provide a steady auxiliary power for the control signal generator during switch-on or switch-off of the switch, maintaining normal operations of the DC power conversion circuit. In addition, when suffering the situation that the load circuit becomes short or open, the DC power conversion circuit controls the working state of the control signal generator via the auxiliary voltage, and thereby appropriately adjusts the switch-on frequency of the switch. Therefore, the DC power conversion circuit can prevent the load circuit, which suffers too high a current, from getting damaged.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A direct-current (DC) power conversion circuit having self-auxiliary power and self-protection against a short or open load circuit comprising:
    a DC voltage source coupled to a grounding end, for providing a DC power;
    a driving circuit comprising:
        a switch having a first end coupled to the DC voltage source, a second end for receiving a control signal, and a third end, the switch used for conducting or cutting off an electrical connection between the first end and the third end according to the control signal received by the second end;
        a first resistor having a first end coupled to the third end of the switch and a second end;
        a control signal generator coupled to the first end of the first resistor and the second end of the first resistor, for sensing voltage of the first resistor, so as to generate the control signal;
        a second resistor having a first end coupled to the DC voltage source and the first end of the switch, and a second end coupled to the control signal generator;
        a diode having a first end coupled to the second end of the first resistor, and a second end coupled to the grounding end; and
        an inductor having a first end coupled to the second end of the first resistor, and a second end coupled to a load circuit; and
    an auxiliary circuit parallel to the inductor, the auxiliary circuit comprising:
        an auxiliary capacitor having a first end coupled to the second end of the first resistor, and a second end coupled to the second end of the second resistor; and
        an auxiliary diode having a first end coupled to the second end of the auxiliary capacitor, and a second end coupled to the second end of the inductor.

2. The DC power conversion circuit of claim 1, wherein the control signal generator is a pulse width modulator.

3. The DC power conversion circuit of claim 1 further comprising a filtering capacitor coupled between the second end of the diode and the second end of the inductor.

4. The DC power conversion circuit of claim 1, wherein the switch is a metal-oxide-semiconductor field-effect transistor (MOSFET transistor).

5. The DC power conversion circuit of claim 4, wherein the first end of the switch is a drain, the second end of the switch is a gate, and the third end of the switch is a source.

6. The DC power conversion circuit of claim 1, wherein the switch is a bipolar junction transistor (BJT).

7. The DC power conversion circuit of claim 6, wherein the first end of the switch is a collector, the second end of the switch is a base, and the third end of the switch is an emitter.

8. The DC power conversion circuit of claim 1, wherein the first end of the diode is N-doped, and the second end of the diode is P-doped.

9. The DC power conversion circuit of claim 1, wherein the first end of the auxiliary diode is N-doped, and the second end of the auxiliary diode is P-doped.

10. The DC power conversion circuit of claim 1, wherein the diode and the auxiliary diode have substantially the same forward bias.

11. The DC power conversion circuit of claim 1, wherein the second diode has high resistance.

12. The DC power conversion circuit of claim 1, wherein the load circuit comprises at least a light emitting diode (LED).

* * * * *